United States Patent
Driever et al.

(10) Patent No.: US 10,353,735 B2
(45) Date of Patent: Jul. 16, 2019

(54) COMPUTING SYSTEM INCLUDING INDEPENDENT COUPLING FACILITIES MAINTAINING EQUIVALENCY BASED ON SEQUENCE VALUES

(71) Applicant: International Business Machines Corporation, Armonk, NY (US)

(72) Inventors: Peter D. Driever, Poughkeepsie, NY (US); Steven N. Goss, Poughkeepsie, NY (US); Michael L. Greenblatt, Jefferson Hills, PA (US); David H. Surman, Milton, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 33 days.

(21) Appl. No.: 15/282,746

(22) Filed: Sep. 30, 2016

(65) Prior Publication Data
US 2018/0095782 A1    Apr. 5, 2018

(51) Int. Cl.
G06F 9/46        (2006.01)
(52) U.S. Cl.
CPC ................... G06F 9/466 (2013.01)
(58) Field of Classification Search
CPC ..................................................... G06F 9/466
See application file for complete search history.

(56) References Cited

U.S. PATENT DOCUMENTS

| | | | |
|---|---|---|---|
| 4,972,314 A * | 11/1990 | Getzinger | G06F 9/4494 711/149 |
| 7,421,549 B2 | 9/2008 | Watanabe | |
| 8,806,143 B1 * | 8/2014 | Cheng | G06F 3/0611 707/799 |
| 9,003,401 B2 | 4/2015 | Dain | |
| 9,407,669 B1 | 8/2016 | Schaefer | |
| 2005/0198453 A1 | 9/2005 | Osaki | |
| 2016/0072909 A1 | 3/2016 | Lubrano | |

FOREIGN PATENT DOCUMENTS

WO        0167247 A1    9/2001

* cited by examiner

*Primary Examiner* — Camquy Truong
(74) *Attorney, Agent, or Firm* — Cantor Colburn LLP; Steven Chiu

(57) ABSTRACT

A computing system is configured to maintain equivalency of independent queues located in different coupling facilities. The computer system includes a first coupling facility and a second coupling facility. The first coupling facility receives a plurality of different commands instructing the first coupling facility to load data into a first structure. The first coupling facility generates a first command data block including first data corresponding to a received first command and a first sequence value indicating a sequence at which the first data was loaded into the first structure with respect to remaining data corresponding to the plurality of commands. A second coupling facility includes a second structure and a second queue. The second coupling facility receives the first command data block from a first queue of the first coupling facility and loads the first data from the second queue into the second structure based on the first sequence value.

20 Claims, 8 Drawing Sheets

COMPUTING SYSTEM INCLUDING INDEPENDENT COUPLING FACILITIES MAINTAINING EQUIVALENCY BASED ON SEQUENCE VALUES

BACKGROUND

In a sysplex computing system, a coupling facility works like a common specialized system shared between operating systems. The coupling facility is a computer, and can fail. Accordingly, the sysplex includes a second (redundant) coupling facility. The first coupling facility (CF1) and the second coupling facility (CF2) can operate in duplex mode during which a command sent from an application to CF1 is also sent to CF2.

Conventional sysplex architectures require that the CF1 and the CF2 communicate with each other to ensure that both completed the command before CF1 responds to the process that sent the command to CF1. That is, the coupling works in a synchronous manner where the application has to wait for the backup CF2 to complete before receiving a response. This delay causes inefficiencies and overall system latency issues.

SUMMARY

According to a non-limiting embodiment, a computing system is configured to maintain equivalency of independent queues located in different coupling facilities. The computer system includes a first coupling facility and a second coupling facility. The first coupling facility receives a plurality of different commands instructing the first coupling facility to load data into a first structure. The first coupling facility generates a first command data block including first data corresponding to a received first command and a first sequence value indicating a sequence at which the first data was loaded into the first structure with respect to remaining data corresponding to the plurality of commands. A second coupling facility includes a second structure and a second queue. The second coupling facility receives the first command data block from a first queue of the first coupling facility and loads the first data from the second queue into the second structure based on the first sequence value.

According to another non-limiting embodiment, a method is provided to maintain equivalency of independent queues in different coupling facilities. The method comprises receiving a plurality of different commands instructing a first coupling facility to load data into a first structure, and generating a first command data block. The first command data block includes first data corresponding to a first command among the plurality of different commands and a first sequence value indicating a sequence at which the first data was loaded into the first structure with respect to remaining data corresponding to the plurality of different commands. The method further includes receiving the first command data block from a first queue included with the first coupling facility. The method further includes loading, by a second coupling facility, the first data from a second queue included with a second coupling facility into a second structure included with the second coupling facility based on the first sequence value.

According to yet another non-limiting embodiment, a computer program product comprises a computer readable storage medium having program instructions for maintaining equivalency of independent queues in different coupling facilities. The program instructions are executable by a processor to perform operations of receiving a plurality of different commands instructing a first coupling facility to load data into a first structure, and generating a first command data block. The first command data block includes first data corresponding to a first command among the plurality of different commands and a first sequence value indicating a sequence at which the first data was loaded into the first structure with respect to remaining data corresponding to the plurality of different commands. The method further includes receiving the first command data block from a first queue included with the first coupling facility. The method further includes loading, by a second coupling facility, the first data from a second queue included with a second coupling facility into a second structure included with the second coupling facility based on the first sequence value.

DETAILED DESCRIPTION

Figure 1:
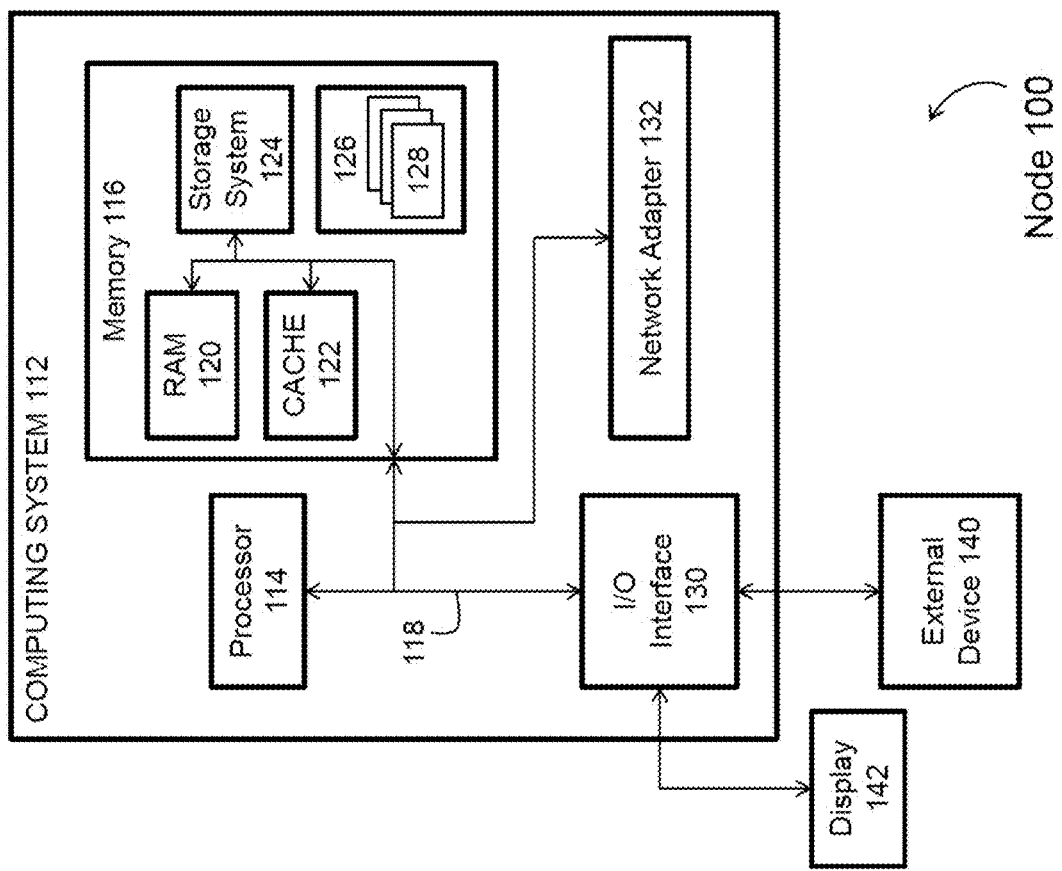
FIG. 1 shows a computer system/server which is applicable to implement various non-limiting embodiments of the present invention.

Various non-limiting embodiments provide an asynchronous duplexing scheme that ensures operations or queue slots are not over-written in a primary (originating) circular queue until information is received from a secondary (receiving) circular queue indicating that the operation corresponding to a queue entry has been completed at the given structure. The circular queues are loaded with data blocks indicating the data loaded to a coupling facility structure, along with corresponding metadata that indicates whether an operation has been processed by a respective coupling facility. The data blocks also include sequence values indicating the order at which the data corresponding to a given data block is loaded in the primary structure (originating structure), while also indicating the order at which the data should also be loaded in the secondary structure (receiving structure). In this manner, functional equivalency is maintained between the primary coupling facility and the secondary coupling facility.

Systems and/or computing devices, such as identification sysplex, may employ any of a number of computer operating systems, including, but by no means limited to, versions and/or varieties of the AIX UNIX and z/OS operating system distributed by International Business Machines Corporation of Armonk, N.Y., the Microsoft Windows operating system, the Unix operating system (e.g., the Solaris operating system distributed by Oracle Corporation of Redwood Shores, Calif.), the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, a notebook, a laptop, a network device, or handheld computer, or some other computing system and/or device (e.g., personal digital assistant (PDA) or cellular telephone 54A, desktop computer 54B, laptop computer 54C, and automobile computer system 54N of FIG. 2).

In general, computing devices further may include a processor (e.g., processor 114 of FIG. 1) and a computer readable storage medium (e.g., memory 116 of FIG. 1), where the processor receives computer readable program instructions, e.g., from the computer readable storage medium, and executes these instructions, thereby performing one or more processes, including one or more of the processes described herein (e.g., identification process).

Computer readable program instructions may be compiled or interpreted from computer programs created using assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the computing device (e.g., a user's computer), partly on the computing device, as a stand-alone software package, partly on a local computing device and partly on a remote computer device or entirely on the remote computer device. In the latter scenario, the remote computer may be connected to the local computer through any type of network (as further described below), including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Computer readable program instructions described herein may also be downloaded to respective computing/processing devices from a computer readable storage medium or to an external computer or external storage device via a network (e.g., any combination of computing devices and connections that support communication). For example, a network may be the Internet, a local area network, a wide area network, a network of interconnected nodes, and/or a wireless network and comprise copper transmission cables, optical transmission fibers, wireless transmission, routers, firewalls, switches, gateway computers and/or edge servers, and utilize a plurality of communication technologies, such as radio technologies, cellular technologies, etc.

Computer readable storage mediums may be a tangible device that retains and stores instructions for use by an instruction execution device (e.g., a computing device as described above). A computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Thus, identification sysplex and method and/or elements thereof may be implemented as computer readable program instructions on one or more computing devices (e.g., computer workstation, server, desktop, etc.), stored on computer readable storage medium associated therewith. A computer program product may comprise such computer readable program instructions stored on computer readable storage medium for carrying and/or causing a processor to carry out the of identification sysplex and method.

The identification sysplex and method and/or elements thereof may also be implemented in a cloud computing architecture; however, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources, such as networks, network bandwidth, servers, processing, memory, storage, applications, virtual machines, and services that can be rapidly provisioned and released with minimal management effort or interaction with a provider of the service. This cloud model may include at least five characteristics (e.g., on-demand self-service, broad network access, resource pooling, rapid elasticity, and measured service), at least three service models (e.g., Software as a Service, Platform as a Service, and Infrastructure as a Service), and at least four deployment models (e.g., private cloud, community cloud, public cloud, and hybrid cloud).

Characteristics are as follows:

On-demand self-service is an example of a cloud model characteristic where a cloud consumer can unilaterally provision computing capabilities, such as server time and network storage, as needed automatically without requiring human interaction with the service's provider. Broad network access is an example of a cloud model characteristic where capabilities are available over a network and accessed through standard mechanisms that promote use by heterogeneous thin or thick client platforms (e.g., computing systems as described above). Resource pooling is an example of a cloud model characteristic where the provider's computing resources are pooled to serve multiple consumers using a multi-tenant model, with different physical and virtual resources dynamically assigned and reassigned according to demand. Further, resource pooling provides a sense of location independence in that the consumer generally has no control or knowledge over the exact location of the provided resources but may be able to specify location at a higher level of abstraction (e.g., country, state, or datacenter). Rapid elasticity is an example of a cloud model characteristic where capabilities can be rapidly and elastically provisioned, in some cases automatically, to quickly scale out and rapidly released to quickly scale in. To the consumer, the rapid elasticity capabilities available for provisioning often appear to be unlimited and can be purchased in any quantity at any time. Measured service is an example of a cloud model characteristic where cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS) is an example of a service model where the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS) is an example of a service model where the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS) is an example of a service model where the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Private cloud is a cloud infrastructure that is operated solely for an organization. Private cloud may be managed by the organization or a third party and may exist on-premises or off-premises. A community cloud is a cloud infrastructure that is shared by several organizations and supports a specific community that has shared concerns (e.g., mission, security requirements, policy, and compliance considerations). A community cloud may be managed by the organizations or a third party and may exist on-premises or off-premises. Public cloud is a cloud infrastructure that is made available to the general public or a large industry group and is owned by an organization selling cloud services. Hybrid cloud is a cloud infrastructure that is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a computing node 100 such as a cloud computing node 100, for example, is shown. The node 100 is only one example of a suitable cloud computing node and is not intended to suggest any limitation as to the scope of use or operability of embodiments of the invention described herein. Regardless, the node 100 is capable of being implemented and/or performing any of the operability set forth hereinabove.

Node 100 includes a computer system/server 112, which is operational with numerous other general purpose or special purpose computing system environments or configurations. Examples of well-known computing systems, environments, and/or configurations that may be suitable for use with computer system/server 112 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system executable instructions, such as program modules, being executed by a computer system. Generally, program modules may include routines, programs, objects, components, logic, data structures, and so on that perform particular tasks or implement particular abstract data types. Computer system/server 112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 112 in cloud computing node 100 is shown in the form of a general-purpose computing device. The components of computer system/server 112 may include, but are not limited to, one or more processors or processing units (e.g., processor 114), a system memory 116, and a bus 118 that couples various system components including memory 116 to processor 114.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 112 typically includes a variety of computer system readable media. Such media may be any available media that is accessible by computer system/server 112, and it includes both volatile and non-volatile media, removable and non-removable media.

The memory 116 can include computer system readable media in the form of volatile memory, such as random-access memory (RAM) 120 and/or cache memory 122. Computer system/server 112 may further include other removable/non-removable, volatile/non-volatile computer system storage media. By way of example only, the storage system 124 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces. As will be further depicted and described below, memory 116 may include at least one program product having a set (e.g., at least one) of program modules that are configured to carry out the operations of embodiments of the invention.

A program/utility 126, having a set (at least one) of program modules 128, may be stored in memory 116 by way of example, and not limitation, as well as an operating system, one or more application programs, other program modules, and program data. Each of the operating system, one or more application programs, other program modules, and program data or some combination thereof, may include an implementation of a networking environment. Program modules 128 generally carry out the operations and/or methodologies of embodiments of the invention as described herein.

Computer system/server 112 may also communicate via Input/Output (I/O) interfaces 130 and network adapters 132, such as with one or more external devices 140 such as a keyboard, a pointing device, a display 142, etc.; one or more devices that enable a user to interact with computer system/server 112; and/or any devices (e.g., network card, modem, etc.) that enable computer system/server 112 to communicate with one or more other computing devices. Such communication can occur. Still yet, computer system/server 112 can communicate with one or more networks such as a local area network (LAN), a general wide area network (WAN), and/or a public network (e.g., the Internet) via network adapter 132. As depicted, network adapter 132 communicates with the other components of computer system/server 112 via bus 118. It should be understood that although not shown, other hardware and/or software components could be used in conjunction with computer system/server 112. Examples include, but are not limited to micro-code, device drivers, redundant processing units, external disk drive arrays, RAID systems, tape drives, and data archival storage systems, etc.

Figure 2:
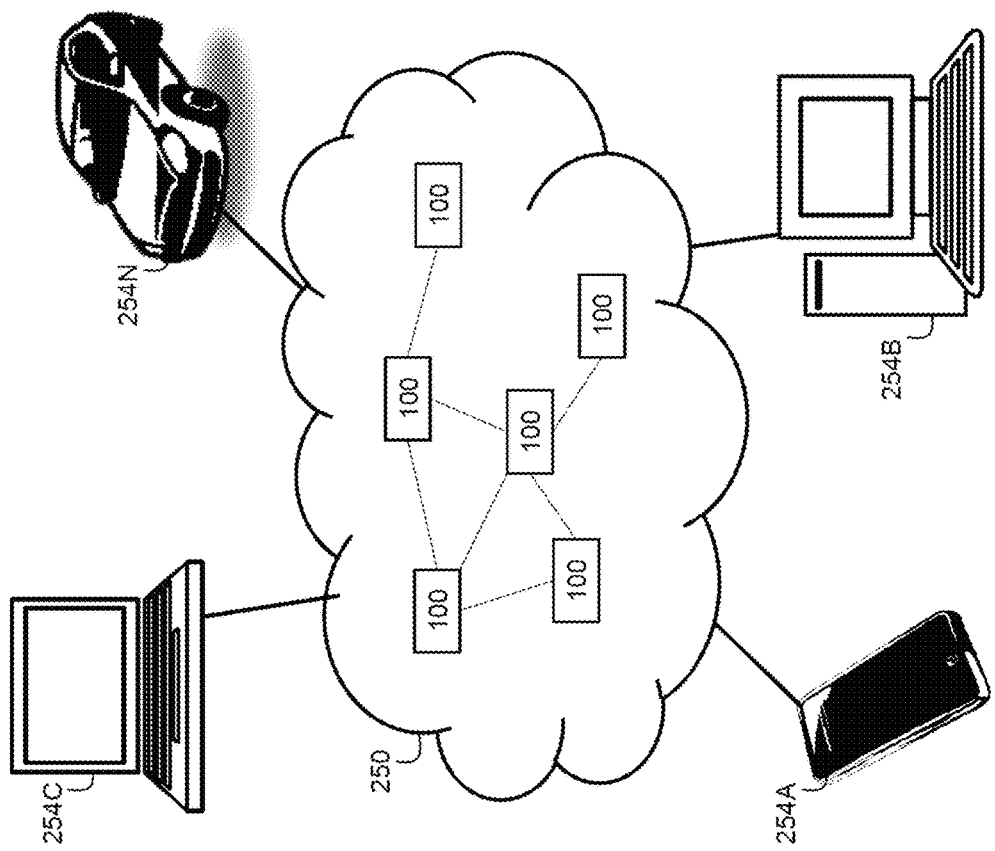
FIG. 2 represents the cloud computing environment according to one embodiment of the present disclosure.

Referring now to FIG. 2, illustrative cloud computing environment 250 is depicted. As shown, cloud computing environment 250 comprises one or more cloud computing nodes 100 with which local computing devices used by cloud consumers, such as, for example, personal digital assistant (PDA) or cellular telephone 254A, desktop computer 254B, laptop computer 254C, and/or automobile computer system 254N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 250 to offer infrastructure, platforms and/or software as services for which a cloud consumer does not need to maintain resources on a local computing device. It is understood that the types of computing devices 254A-N shown in FIG. 2 are intended to be illustrative only and that computing nodes 100 and cloud computing environment 250 can communicate with any type of computerized device over any type of network and/or network addressable connection (e.g., using a web browser).

Figure 3:
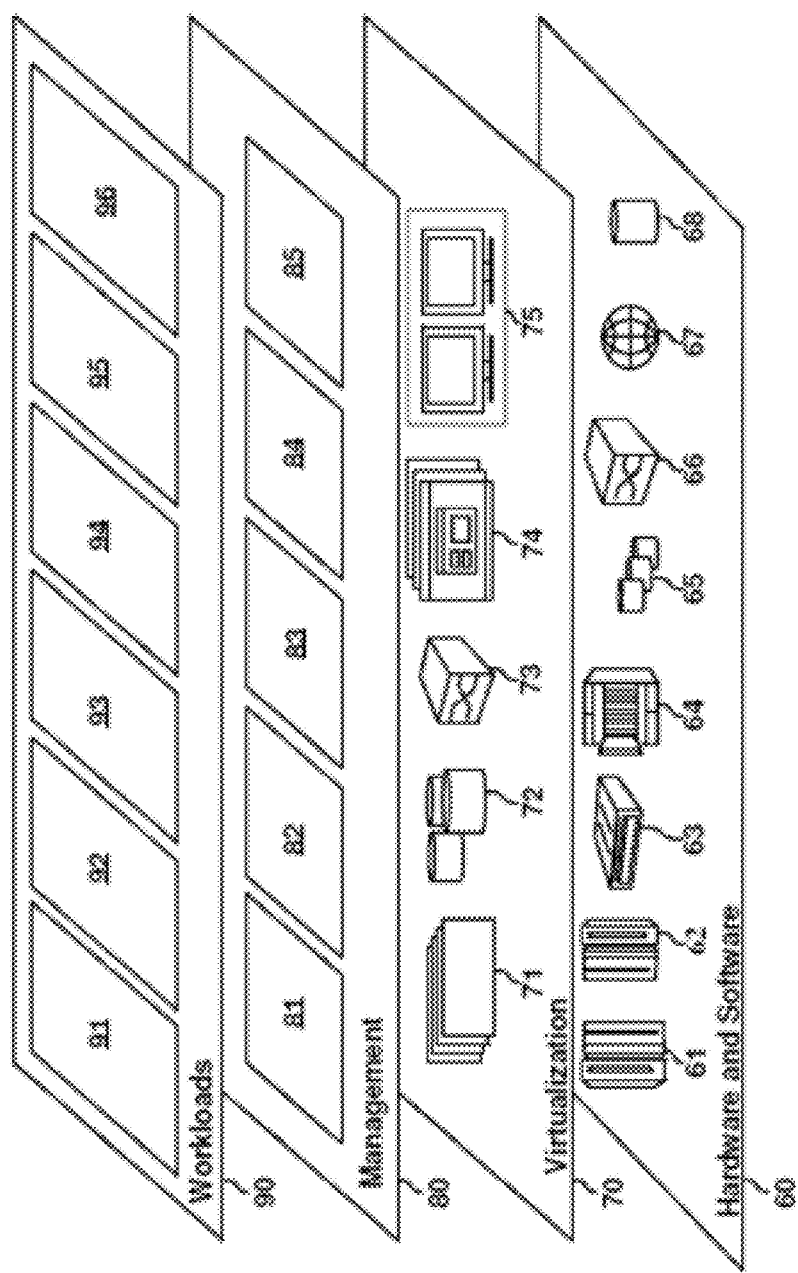
FIG. 3 represents an abstract model layer according to one embodiment of the present disclosure.

Turning now to FIG. 3, a set of functional abstraction layers provided by cloud computing environment 250 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software analysis 96.

Figure 4:
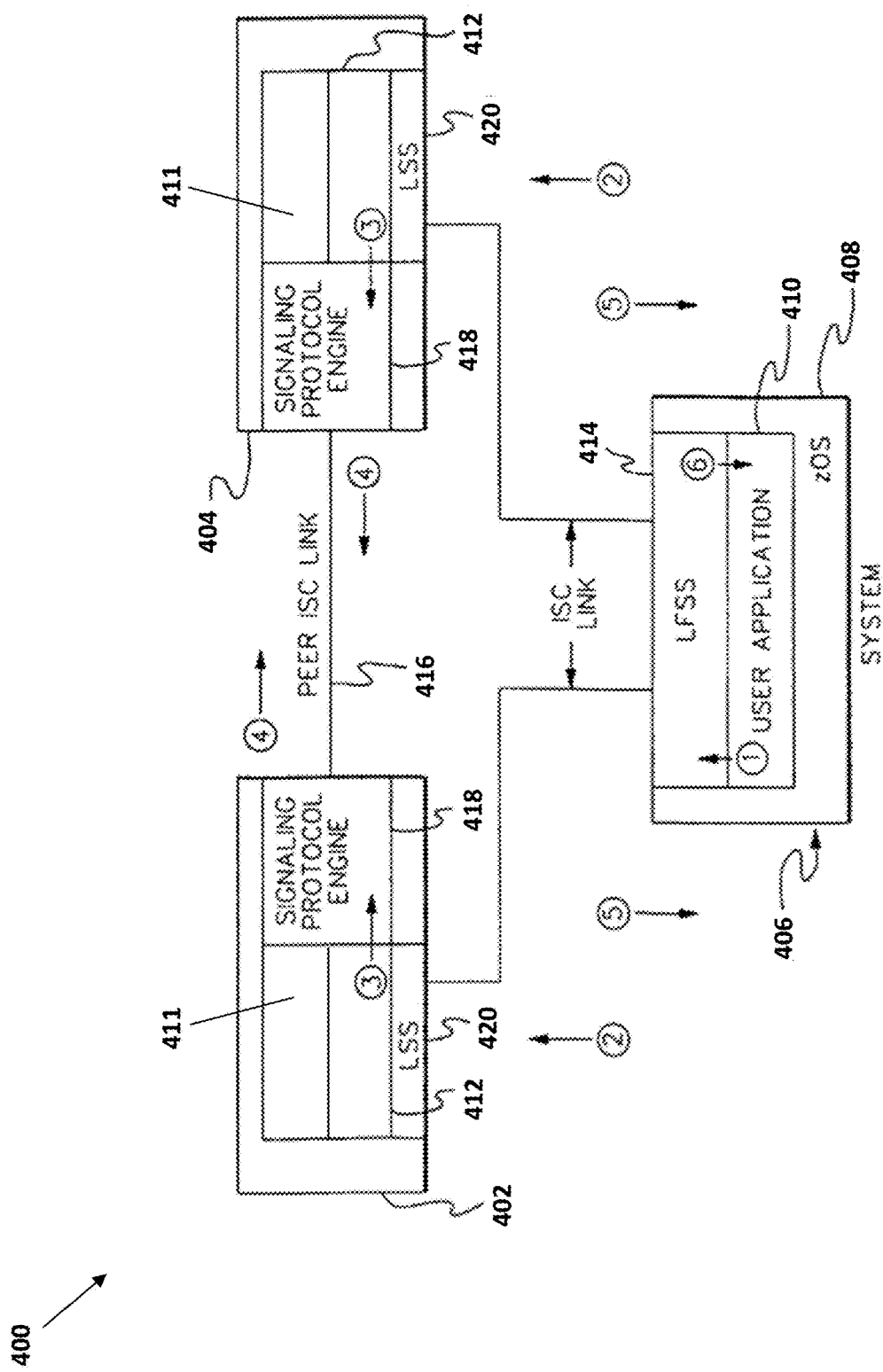
FIG. 4 illustrates a computing environment including first and second coupling facilities coupled to a computing system in a parallel sysplex.

FIG. 4 depicts one embodiment of a computing environment 400, which includes two coupling facilities 402, 404 coupled (i.e., in signal communication) to a computing system 406 in a parallel sysplex. The two coupling facilities will be referred to hereinafter as a primary coupling facility (primary CF) 402 and a secondary coupling facility (secondary CF) 404. Although two coupling facilities 402, 404 are described herein, more than two coupling facilities may be coupled (i.e., in signal communication) with one another. It is also not necessary for all coupling facilities to be coupled to each other. For instance, a third coupling facility (not shown) may be coupled to the second coupling facility 404 via a peer connection, but not to the first coupling facility 402. In addition to the arrangement described above, the coupling facilities 402, 404 that are coupled may be in separate Central Processing Complexes (CPC), in separate partitions of one CPC, or a combination thereof. In the situation that the coupling facilities 402, 404 are located in separate partitions of one CPC, the same links can be used for both duplexing and command traffic.

The computing environment 400 described herein can run an instance of the z/OS operating system 408 offered by International Business Machines Corporation, Armonk, N.Y. Further, in one example, the system 408 is running an application 410 that is coupled to a coupling facility structure 411 (e.g., storage device, cache, list type, etc.), whose location is unknown to the application 410. The actual physical connection is managed by a Locking Facility Support Services (LFSS) component 414 of the z/OS operating system 408 and commands initiated by the user application 410 flow through the LFSS component 414. Although one operating system 408 is illustrated, it should be appreciated that several different operating systems can be in signal communication with the primary coupling facility 402 and/or the secondary facility 404.

Two instances of a coupling facility structure 411 are maintained in the separate coupling facilities 402, 404. The primary coupling facility 402 includes a primary structure 411 and a primary queue 412. The secondary coupling facility 404 includes a secondary structure 411 and a secondary queue 412. As commands are processed by a respective coupling facility 402, 404, the respective structure 411 is updated. In turn, a respective queue 412 is updated once data corresponding to the command is loaded into the structure 411.

Figure 5:
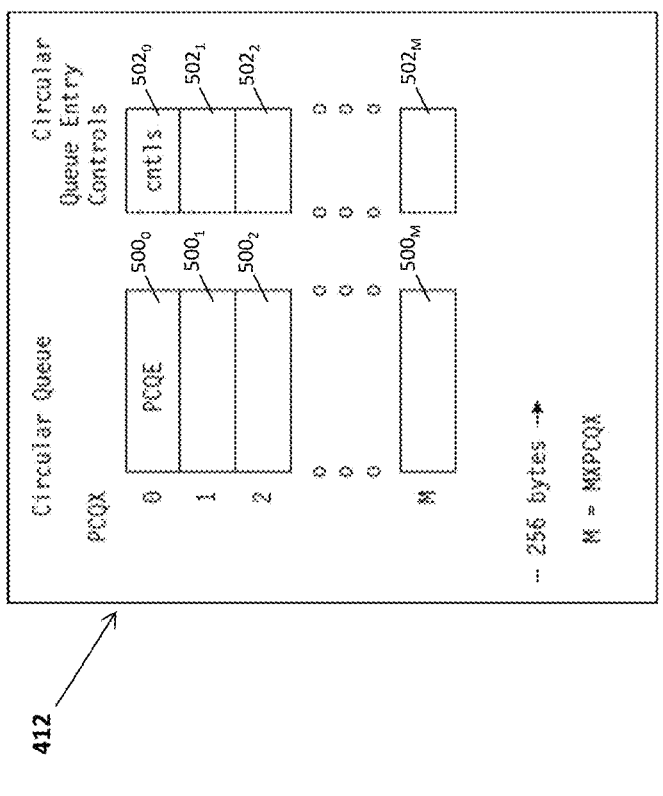
FIG. 5 illustrates a circular queue included in the first and second coupling facilities illustrated in FIG. 4 according to a non-limiting embodiment.

According to a non-limiting embodiment, the queues 412 can be configured as a circular queue 412 (see FIG. 5). The circular queue 412 can be configured as a PLSO circular queue 412 including a plurality of queue slots and $500_0$-$500n$ and a plurality of control slots $502_0$-$502n$. The queue slots $500_0$-$500n$ are configured to store a sequence of objects referred to as PLSO-circular-queue entries (PCQE). The PLSO-circular-queue entries are numbered from zero to the maximum PLSO circular queue index (MXPCQX, which can be expressed as MXPCQX=(2 raised to the (12+PCQCH) power)), and are addressed by the PLSO-circular-queue index (PCQX). The PLSO-circular-queue entries are 256 bytes wide and the entire PLSO circular queue 412 is 2 raised the PCQCH power megabytes in size. The PLSO circular queue entry controls are maintained in a parallel array structure to the PLSO circular queue 412, with a PLSO circular queue entry control for each PLSO circular queue entry. The PLSO circular queue entry control contains state information associated with the corresponding PLSO-circular queue entry.

The storage backing both the PLSO circular queue 412 and the PLSO circular queue entry controls are included in the computation of the structure size.

The PLSO circular queue entries are assigned to push operations in the primary structure sequentially, starting at entry 0 and continuing to entry MXPCQX, at which point the assignment wraps back to entry 0. The push operations can be represented as a push operation value or number. Reassignment of entries cannot occur until the previous operation assigned to the entry has been completed in the secondary structure 411 and recognized as complete in the primary structure 411, or until an activate-duplexing command has returned the entry to the unassigned state.

Figure 6:
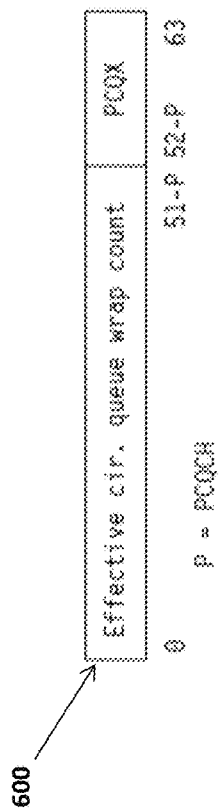
FIG. 6 depicts a format of a push operation sequence value according to a non-limiting embodiment.

Turning to FIG. 6, a format of a push operation sequence value 600 is illustrated according to a non-limiting embodiment. The push operation sequence value 600, also called the operation sequence value 600 when the context is clear, is a 64-bit unsigned binary integer that is assigned to each push operation. Assignments of operation sequence values 600 occur when a new push operation is generated by a list-structure command. The push operation sequence values 600 are assigned in sequential order. There is an inherent relationship between the operation sequence value 600 and the PLSO circular queue entry. In particular, the PLSO circular queue index matches the rightmost 12+PCQCH bits of the operation sequence value 600. Since the assignment of circular queue entries is sequential, wrapping back to entry 0 when entry MXPCQX is reached, the leftmost (52−PCQCH) bits of the operation sequence value 600 is the effective wrap count of the PLSO circular queue 412 since duplexing was activated.

Figure 7:
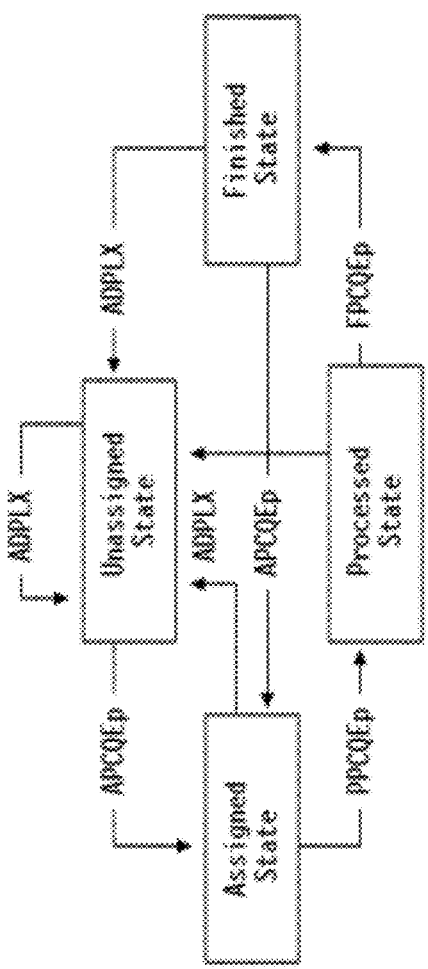
FIG. 7 is a state diagram of the circular queue entries in the primary coupling facility according to a non-limiting embodiment.
Figure 8:
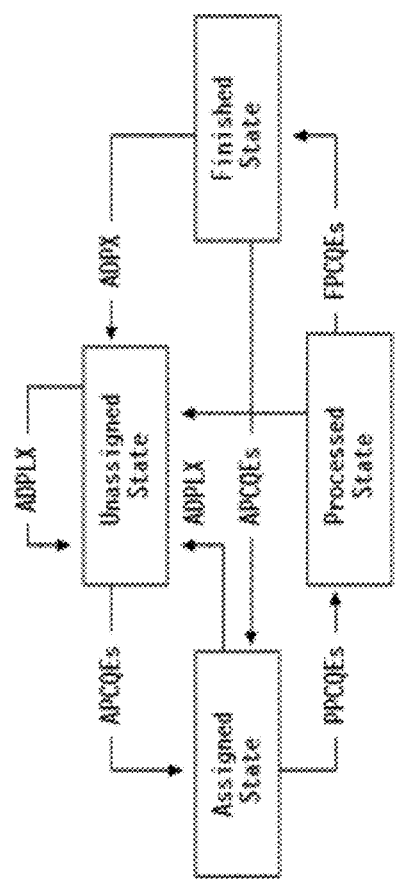
FIG. 8 is a state diagram of the circular queue entries in the secondary coupling facility according to a non-limiting embodiment.

The first and second circular queues 412 can operate according to circular queue entries in the first and second coupling facilities 402, 404, respectively. A state diagram of the circular queue entries in the primary coupling facility 402 is illustrated in FIG. 7. Similarity, a state diagram of the circular queue entries in the secondary coupling facility 404 is illustrated in FIG. 8. The PLSO Circular Queue Entry Controls that may be loaded in the control slots $502_0$-$502n$ are illustrated in Table 1 below.

TABLE 1

| PLSO Circular Queue Entry Control | Acronym |
| --- | --- |
| PLSO circular queue entry state | PCQEST |
| Primary assigned state timestamp t1 | PAST1 |
| Primary processed state timestamp t2 | PPST2 |
| Secondary assigned state timestamp t3 | SAST3 |
| Secondary processed state timestamp t4 | SPSP4 |
| Secondary finished state timestamp t5 | SFST5 |
| Primary finished state timestamp t6 | PFST6 |

The various PLSO Circular Queue Controls are described below.

The PLSO Circular Queue Entry State (PCQEST) is a one-byte value that indicates the state of a PLSO circular queue entry. There is a PCQEST object for each PLSO circular queue entry. The following PLSO circular queue entry states are defined as:

(i) X'00'—Unassigned which is the initial state after duplexing is activated;
(ii) '01'—Assigned in the primary coupling facility 402;
(iii) X'02'—Processed in the primary coupling facility 402;
(iv) X'03'-assigned in the secondary coupling facility 404;
(v) X'04'—Processed in the secondary coupling facility 404;
(vi) X'05'-Finished in the secondary coupling facility 404; and
(vii) X'06'—Finished in the primary coupling facility 402.

The Primary Assigned State Timestamp T1 (PAST1) is a 64-bit unsigned binary integer that contains the current TOD of the PLSO circular queue entry assignment event in the primary coupling facility 402. The PAST1 is set when a push operation sequence value is assigned to a push operation. The PCQX portion of the sequence value identifies the PLSO circular queue entry and the associated control entry. The primary assigned state timestamp is zero when the PLSO circular queue entry state is X'00'. The value of the PAST1 is valid in both primary and secondary CF controls by being transferred from the primary coupling facility 402 to the secondary coupling facility 404 within the POB of the PLSO command.

The Primary Processed State Timestamp T2 (PPST2) is a 64-bit unsigned binary integer that contains the current TOD of the PLSO circular queue entry processed event in the primary coupling facility 402. The PPST2 is set when the push operation contained in the PLSO circular queue entry is selected for transmission to the secondary coupling facility 404. The primary processed state timestamp is zero when the PLSO circular queue entry state is X'00' or X'01'. The value of the PPST2 is zero not defined in the secondary circular queue controls.

The Secondary Assigned State Timestamp T3|(SAST3) is a 64-bit unsigned binary integer that contains the current TOD of the PLSO circular queue entry assignment event in the secondary coupling facility 404. The SAST3 is set when the PLSO command is executed and the push operation block is placed in the PLSO circular queue entry. The secondary assigned state timestamp is zero when the PLSO circular queue entry state is X'00'. The value of the SAST3 is zero not defined in the primary circular queue controls.

The Secondary Processed State Timestamp T4(SPST4) is a 64-bit unsigned binary integer that contains the current TOD of the PLSO circular queue entry processed event in the secondary coupling facility 404. The SPST4 is set when the push operation is executed in the secondary structure 411 and has completed execution. The secondary processed state timestamp is zero when the PLSO circular queue entry state is X'00', or X'03'. The value of the SPST4 is zero not defined in the primary circular queue controls.

The Secondary Finished State Timestamp T5 (SFST5) is a 64-bit unsigned binary integer that contains the current TOD of the PLSO circular queue entry finished event in the secondary coupling facility 404. The SFST5 is set when the completion of the push operation has been reported in a PLSO response data block. The secondary finished state timestamp is zero when the PLSO circular queue entry state is X'00', X'03', or X'04'. The value of the SFST5 is zero not defined in the primary circular queue controls.

The Primary Finished State Timestamp T6 (PFST6) is a 64-bit unsigned binary integer that contains the current TOD of the PLSO circular queue entry finished event in the primary coupling facility 402. The PFST6 set is when the primary coupling facility 402 receives confirmation of completion of the push operation in the secondary structure 411. The primary finished state timestamp is zero when the PLSO circular queue entry state is X'00', X'01, or X' 02'. The value of the PFST6 is zero not defined in the secondary circular queue controls.

The various states described are cycled according to the transition commands shown in TABLE 2 below.

TABLE 2

| | |
|---|---|
| APCQEs | Assign PCQE in secondary coupling facility |
| PPCQEs | Process PCQE in secondary coupling facility |
| FPCQEs | Finish PCQE in secondary coupling facility |
| ADPLX | Active-Duplexing command |
| APCQEp | Assign PCQE in primary coupling facility |
| PPCQEp | Process PCQE in primary coupling facility |
| FPCQEp | Finish PCQE in primary coupling facility |
| DDPLX | Deactivating duplexing |

TABLE 2-continued

| | |
|---|---|
| dplxt = 00 | Duplexing type is B'00' |
| dplxt = 01 | Duplexing type is B'01' |
| dplxt = 10 | Duplexing type is B'10' |
| dplxt = any | All three duplexing types apply |

Referring back to FIG. 4, a CF-to-CF connection 416 (e.g., a peer connection), such as an Intersystem Channel (ISC) link, couples together the primary and secondary coupling facilities 402, 404. Although various non-limiting embodiments described herein employ an ISC link to couple the two coupling facilities 402,404, the invention is not limited thereto. Other links may be used including, but not limited to, an integrated cluster bus (ICB) link or an internal-coupling (IC) link. In addition, multiple peer links can be configured as redundant connections. In this scenario, the duplexing protocol recognizes a link failure and maintains signal exchanges on surviving links.

The peer ISC link 416 can transmit both primary message commands and secondary message commands in either direction. This may be physically represented by either two unidirectional links, one with a sender channel on the primary coupling facility 402 and a receiver channel on the secondary coupling facility 404, and the second link oppositely configured. This may also be represented by a single physical link where the channel interface in each coupling facility 402, 404 supports both sender and receiver functionality. This latter capability exists in ISC3 links and their variants: ICB3 and IC3.

The peer ISC link 416 between the coupling facilities 402, 404 is used, for instance, to exchange message path commands on the primary message command interface to configure and couple the primary and secondary coupling facilities 402, 404. Once configured and coupled, the peer ISC link 416 is also used to send secondary commands of the list-notification type to exchange signals as part of a signaling protocol for duplexed command execution. The sending and receiving of these secondary commands are managed by a coupling facility component referred to as a signaling protocol engine 418. Requests by the structure component 411 of the respective coupling facility 402, 404 for sending and receiving duplexing signals flow through the signaling protocol engine 418.

Still referring to FIG. 4, a normal command execution for the coupling facility-to-coupling facility duplexing mode is illustrated according to various non-limiting operations (e.g., Operations 1-6) that approximate the time sequence of the command. In these operations, various components of the signaling protocol are described.

At Operation 1, for example, a user application 410 generates a command and communicates this command to the LFSS 414 through a system macro interface.

Turning to Operation 2, the LFSS 414 creates two copies of the command, sending one to the primary coupling facility 402 and the second to the secondary coupling facility 404. The LFSS 414 uses an asynchronous SEND MESSAGE interface without notification to allow the two commands to be initiated in parallel. The LFSS 414 also sets a synchronous completion on initial status (SCIS) bit of the SEND MESSAGE to minimize the effects of any busy conditions encountered on the channel interface. A link-subsystem (LSS) component 420 of the coupling facility control code (CFCC) in the primary coupling facility 402 receives the command and transfers control to the primary structure 411 as appropriate. Likewise, the link-subsystem (LSS) component 420 in the secondary coupling facility 404 receives the command and transfers control to the secondary structure 411, as appropriate.

At Operation 3, the primary coupling facility 402 executes the command to the point where a message response block (MRB) would be returned to the application 410. However, before sending the MRB and while the internal latches are held for the objects referenced by the command, a request is made to the signaling protocol engine 418 in the primary coupling facility 402 to send a completion signal on the peer ISC link 416 to the secondary coupling facility 404. Likewise, the secondary coupling facility 404 executes the command to the point where the MRB would be returned to the application 410. However, before sending the MRB and while the internal latches are held for the objects referenced by the command, a request is made to the signaling protocol engine 418 in the secondary coupling facility 404 to send a completion signal on the peer ISC link 416 to the primary coupling facility 402.

With reference to Operation 4, the signaling protocol engine 418 in the primary coupling facility 402 sends the completion signal to the secondary coupling facility 404 and then waits for the reception of the completion signal from the secondary coupling facility 404. Likewise, the signaling protocol engine 418 in the secondary coupling facility 404 sends the completion signal to the primary coupling facility 402 and then waits for the reception of the completion signal from the primary coupling facility 402.

Turning to Operation 5, when the primary coupling facility 402 recognizes the reception of the completion signal from the secondary coupling facility 404, the primary coupling facility 402 sends the MRB and releases the latches. Likewise, when the secondary coupling facility 404 recognizes the reception of the completion signal from the primary coupling facility 402, it also sends the MRB and releases the latches. If a failure occurs during this period of time and either the primary coupling facility 402 or the secondary coupling facility 404 fails to recognize the reception of a completion signal, then the coupling facility breaks or interrupts the duplexing by, for instance, resetting a duplexing state indicator (e.g., duplexing active state indicator) for the structure.

At Operation 6, it is assumed that no errors have occurred. Accordingly, the LFSS 414 receives both MRBs from the primary and secondary coupling facilities 402, 404 and constructs a single MRB by reconciling the results of the two MRBs which is then passed to the application 410. If on the other hand, duplexing has been broken by one of the two coupling facilities 402, 404, then the operating system 408 invokes failover recovery and one of the two structures is selected as the surviving instance. Once the error is corrected, duplexing can be reestablished.

With the above processing, user transparency is provided because the duplexing functions are performed by the LFSS 414 without awareness by the user application 410. Failure isolation is also provided by creating two copies of the structure in separate coupling facilities 402, 404, each of which can continue as the surviving structure in a situation involving the failure of the other. Further, command atomicity is provided by maintaining latches on both structures until both commands complete.

In at least one embodiment, the computing system 400 can operate in an asynchronous mode which reduces latency resulting from the communication between the primary coupling facility 402 and the secondary coupling facility 404. When operating in the asynchronous mode, the command initiated by the application 410 is sent to the primary coupling facility 402, and in turn, the primary coupling facility 402 will initiate operations to send the information, via a command, needed for the secondary coupling facility 404 to create a second structure 411 similar to the first structure 411 existing in the primary coupling facility 402. However, the primary coupling facility 402 does not need to wait for the completion of the command and changes to the second structure 411 in the secondary coupling facility 404 before responding to the command from the primary coupling facility 402. This asynchronous mode can be referred to as "asynchronous CF duplexing".

When operating in the asynchronous mode (i.e., according to asynchronous CF duplexing), the primary coupling facility 402 and the secondary coupling facility 404 create and maintain several internal facilities and values which are available to the operating system 408. The operating system 408 can use this information to be knowledgeable of the commands that have been applied to both the primary coupling facility 402 and the secondary coupling facility 404 and which may be outstanding between the primary coupling facility 402 and the secondary coupling facility 404 (i.e., the asynchronous aspect). The operating system 408, along with the applications 410 making use of the CF functions, together can use this information to overlap as many operations as they determine appropriate between them. In this manner, the coupling facilities 402, 404 need only wait for information to be reflected in both the primary structure 411 and secondary structures 411 where needed.

At least one embodiment described herein provides a system 400 configured to utilize sequence values associated with each respective structure 411 to maintain equivalency between the primary coupling facility 402 and the secondary coupling facility 404. As discussed above, the primary coupling facility 402 and the secondary primary facility 404 each include a circular queue 412 configured to store updates associated with a primary structure 411 and a secondary structure 411, respectively. A command initiated by the application 410 is first processed at the primary coupling facility 402. In response to processing the command, data is applied to storage inside the primary structure 411. Several commands may be received by the primary coupling facility 402 over a period of time, and thus the data is stored in the structure 411 according to a unique order. This unique order must be maintained when storing the data in the secondary structure 411, e.g., when updating the secondary structure 411. Thus, updates to the secondary structure 411 are applied in a consistent order with respect to the primary structure 411 so that final state of the secondary structure 411 matches the final state of the primary structure 411 at any given time.

The queues 412 are configured to store the data relative to the changes of the respective structure 411, along with metadata associated with the data. The metadata includes information indicating when data was applied to a particular structure 411, (i.e., a position of application among a sequence of data applications or updates), the order at which the data is stored in a particular queue 412, and the position or sequence at which it should be applied to the secondary structure 411. The metadata can also include data indicating the state of a data in a respective structure 411, e.g., whether the data has in fact been applied in the secondary structure 411, or whether the data is still waiting to be applied to the secondary structure 411.

For instance, a sequence value associated with data used to update the primary structure 411 indicates the order at which that particular data was applied to the primary structure 411, i.e., a given data block was the second data block applied to the primary structure 411 among a plurality of different data blocks applied at different periods of time. This order can then be queued up in the secondary queue 412 according to a respective sequence value, and in turn, the secondary structure 411 is then updated according to the sequence values included in the data blocks stored the secondary queue 412. That is, the changes in the secondary structure 411 occur in a particular order indicated by the sequence values stored in the secondary queue 412. In this manner, the final state of the secondary structure 411 matches the final state of the primary structure 411 while allowing to free up the primary coupling facility 402 since the data is sent and stored in the circular queue 412.

The sequence value is defined by a set number of bits/bytes including low-order bits/bytes and high-order bits/bytes. The low-order bits/bytes, for example, are utilized to index the data into a queue slot (not shown in FIG. 4) included in each circular queue 412. In this manner, the circular queue 412 operates as an ordered queue capable of indicating the specific sequence of processes or updates that must be applied to a respective structure 411 in order to achieve equivalency between the primary structure 111 and the secondary structure 411. In at least one embodiment, the position of the queue slot storing a data block does not match the sequence value assigned to the data block. This disparity between the queue slot position and the sequence value, however, does not prevent synchronizing the primary and second structures 411 because a structure 411 is updated with data based on the sequence value regardless as to its location (i.e., the location of the queue slot) within the respective circular queue 412. Accordingly, functional equivalency between the primary structure 411 and the secondary structure 411 is maintained.

For instance, the primary circular queue 412 queues up or buffers the events or updates in a particular sequence according to the time at which the event or update was applied to the primary structure 411. That is, at the time data (e.g., $DATA_M$) is applied to the primary structure 411, the primary coupling facility 402 assigns a sequence value to the applied data ($DATA_M$), and then stores a data block including the applied data ($DATA_M$) and the sequence value into a queue slot in the primary circular queue 412. Similarly, the secondary queue 412 queues up or buffers the same events or updates from the primary queue 412. The secondary queue 412, however, indicates the sequence or order at which each queued event or update should be applied to the secondary structure 411 in order to synchronize the updates between the primary structure 411 and the secondary structure 411. Thus, should the secondary queue 412 be queued with other data prior to receiving $DATA_M$ (i.e., the position of the data within the secondary queue 412 does not match the sequence value assigned by the primary coupling facility 402) the second coupling facility 404 can still apply $DATA_M$ in the correct order with respect to the primary structure 411 based on the sequence value assigned to $DATA_M$.

In at least one embodiment, the circular queues 412 contain information of Push Operation Block (POB) and corresponding metadata, such as whether an operation has been processed or "pushed out" at a particular coupling facility 402, 404. If a circular queue 412 at a receiving end is full, the circular queue 412 at the originating end will also be full and the originating coupling facility halts.

For example, the operating system 408 may receive a response from the primary coupling facility 402 indicating that its respective circular queue 412 is full. Alternatively or in addition, the operating system 408 may check the status of the primary circular queue 412. Based on this information, the level of required serialization at both the primary coupling facility 402 and the secondary coupling facility 404 can be maintained.

The primary and secondary coupling facilities 402, 404 can also monitor their respective queues 412, determine the status of the data stored therein, and then inform one another the status of their respective queues 412. For instance, the secondary coupling facility 404 may that determine data (e.g., $DATA_M$) stored in a particular queue slot (e.g., $SLOT_M$) in the secondary queue 412 has been applied to the structure 411 and is therefore completed. The secondary queue 412 then communicates this status of $DATA_M$ to the first primary coupling facility 402. Based on this information, the primary coupling facility 402 can purge $DATA_M$ from its primary queue 412 and thus free up the queue slot which previously stored $DATA_M$.

Figure 9:
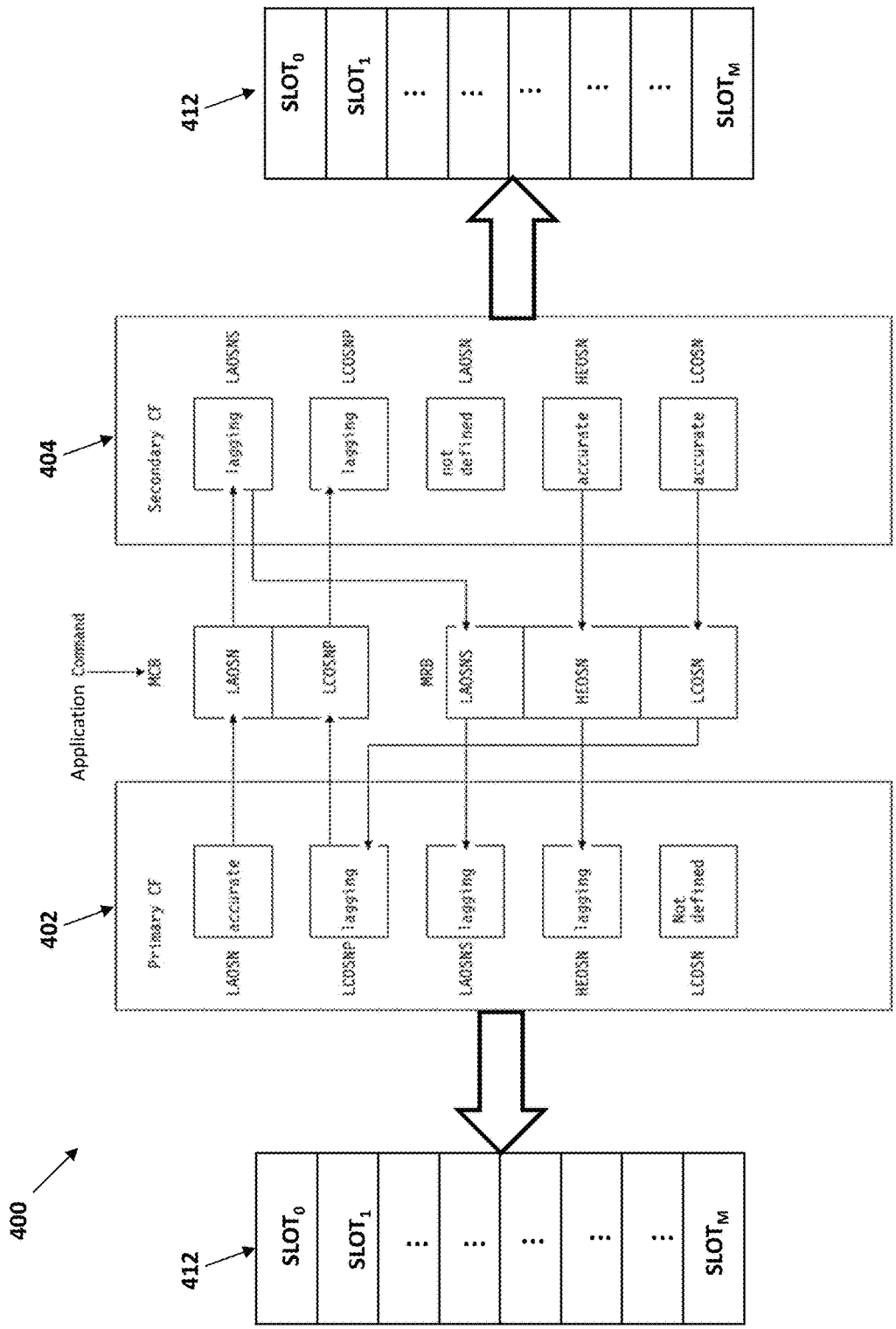
FIG. 9 is process flow diagram illustrating an operation sequence value flow between the primary coupling facility and the secondary coupling facility according to a non-limiting embodiment.

Turning now to FIG. 9, an operation sequence value flow process between the primary coupling facility 402 and the secondary coupling facility 404 is illustrated according to a non-limiting embodiment. In essence, the process flow of FIG. 9 conveys an example as to how the secondary coupling facility 404 stays up-to-date with respect to changes occurring in the primary coupling facility 402. The command column represents operands in the command's MCB and MRB used to update objects (e.g., queue slots) in the queue 412 of the primary and secondary coupling facilities 402, 404, respectively. The "Accurate" identifier indicates that the value is current and updated regularly by CFCC operations. The "Lagging" identifier indicates that the most accurate value for the operational sequence number (OSN) is within the other CFCC image.

As new commands (indicated as arrows extending left-to-right) in the form a message command data block (MCB) are sent from the primary coupling facility 402 to the secondary coupling facility 404, the secondary coupling facility 404 replies with responses (indicated by arrows extending right-to-left) in the form a message response data block (MRB). These responses indicate a current view as to the status of the secondary structure 411, i.e., which events or updates sent to the secondary queue 412 have actually been applied to the secondary structure 411. Accordingly, the primary coupling facility 402 is made aware of the current operation status of the secondary coupling facility 404, along with the current status of the secondary structure 411 with respect to the primary structure 411.

Still referring to FIG. 9, the circular queues 412 maintain a set of objects for each structure 411 that are used to control and monitor the duplexing operation for the structure 411. All operation sequence values will be initialized to 0 at the time a structure 411 is allocated. However, the queue order at which each object is stored in the circular queue 412 is independent from the order at which the data corresponding to a given object is stored in the respective structure 411.

The current value of some operational sequence values are passed from one coupling facility to another coupling facility via the MCB/MRB of the Push List Structure Object (PLSO) command. In at least one embodiment, a single MCB/MRB can be exchanged or a plurality of MCB/MRBs can be exchanged at one time. All structures 411 maintain the full set of operation sequence values regardless of the duplexing type (asynchronous primary or secondary). Based on the duplexing type allocated to the structure 411, however, these values will take on one of the following general characteristics: (I) Functional and Accurate; (II) Functional and Lagging; (III) Informational and Lagging; (IV) Not Defined; and (V) Failed Operation Sequence value (FOSN).

The Functional and Accurate characteristic indicates the OSN value is generated within a given coupling facility and is used to maintain the asynchronous duplexing operations. The Functional and Lagging characteristics indicates that the value is not generated within the given coupling facility but is acquired from the attached coupling facility and is important to the maintenance of the asynchronous duplexing operations.

The Informational and Lagging characteristic indicates that the value is not generated within the given coupling facility but is passed from the attached coupling facility and is not used for the maintenance of the asynchronous duplexing operations. It is available for informational purposes as to the progress of the attached coupling facility as last acquired by the given coupling facility.

The Not Defined characteristic indicates that the value is not altered by a given coupling facility during the execution of asynchronous duplex operations and remains at the value that was either initialized at allocation time or set at the time that asynchronous duplexing was successfully activated. If the structure 411 is not capable of synchronous duplexing, all OSN values have the characteristic of not defined. The operation sequence value objects are defined in the sections that follow.

The Failed Operation Sequence value (FOSN) characteristic is a 64-bit unsigned binary integer that contains the value of the push operation sequence value that was being processed when an error was encountered that resulted in a duplexing failure. This value is initialized to 0 at the time the structure 411 is allocated, and is set to 0 when an activate duplexing command is successfully completed. It is set to a value when a duplexing failure occurs. If the value of the Duplexing Failure Reason Code (DFRC) is not meaningful, the FOSN is set to zero. If the value DFRC is meaningful, the FOSN is set to a value which indicates the operation sequence value which was being processed when an error was encountered that resulted in a break duplexing failure. This value is for informational purposes to help in problem determination. The Last Completed Operational Sequence value (LCOSN) is used to determine the final state of the structure 411 for any recovery operations.

Highest Executable Operation Sequence value (HEOSN) is a 64-bit unsigned binary integer that contains the value of the upper bound of the continuous sequence of assigned sequence values that have been received by the secondary facility 404 but have not yet completed in the secondary structure 411. It represents the last duplexed operation that can be completed in the secondary structure 411 without further execution of PLSO commands. The value in the primary is greater than or equal to the last completed operation sequence value primary and less than or equal to the last assigned operation sequence value. The value in the secondary is greater than or equal to the last completed operation sequence value and less than or equal to the last assigned operation sequence value secondary. The value is only meaningful if duplexing is, or was at one time, activated and the duplexing type is B'01' or B'10'. The value has the characteristic of "functional and accurate" if duplexing is or was active and the duplexing type is B'10'. The value has the characteristic of "informational and lagging" if duplexing is active and the duplexing type is B'01'. The value is initially set when asynchronous duplexing is activated to the value of the LAOSN operand with Bits (52–PCQCH) to 63 set to 1 and is updated as operations progress.

Last Assigned Operation Sequence value (LAOSN) is a 64-bit unsigned binary integer that contains the value of the highest numbered sequence value assigned to an asynchronous duplexing operation. The value is only meaningful if duplexing is, or was at one time, activated and the duplexing type is B'01' or B'10'. The value has the characteristic of "not defined" if the duplexing type is B'10'. The value has the characteristic of "functional and accurate" if duplexing is active and the duplexing type is B'01'. The value is set when asynchronous duplexing is activated to the value of the LAOSN operand with Bits (52–PCQCH) to 63 set to 1.

Last Assigned Operation Sequence value Secondary (LAOSNS) is a 64-bit unsigned binary integer that contains the value of the highest numbered sequence value assigned to an asynchronous duplexing operation as indicated by the primary coupling facility 402 and received by the secondary coupling facility. The value is only meaningful if duplexing is, or was at one time, activated and the duplexing type is B'01' or B'10'. The value has the characteristic of "informational and lagging" if duplexing is active and the duplexing type is B'10'. The value has the characteristic of "informational and lagging" if duplexing is active and the duplexing type is B'01'. The value is set when asynchronous duplexing is activated by the activate-duplexing command to the value of the LAOSN operand with Bits (52–PCQCH) to 63 set to 1.

Last Completed Operation Sequence value (LCOSN) is a 64-bit unsigned binary integer that contains the value of the highest numbered sequence value that has been executed in the secondary list structure. It represents the last operation that has been mirrored in both the primary and secondary structures 411. The last completed operation sequence value is less than or equal to the highest executable operation sequence value. The value is only meaningful if duplexing is, or was at one time, activated and the duplexing type is B'10'. The value has the characteristic of "functional and accurate" if duplexing is active and the duplexing type is B'10'. The value has the characteristic of "not defined" if duplexing is active and the duplexing type is B'01'. The value is set when asynchronous duplexing is activated by the activate-duplexing command to the value of the LAOSN operand with Bits (52–PCQCH) to 63 set to 1.

Last Completed Operation Sequence value Primary (LCOSNP) is a 64-bit unsigned binary integer that contains the value of the highest numbered sequence value that has been executed in the secondary structure 411. It represents the last operation that has been completed in both the primary and secondary structures 411 which has been recognized by the primary coupling facility. The last completed operation sequence value is less than or equal to the highest executable operation sequence value. The value is only meaningful if duplexing is, or was at one time, activated and the duplexing type is B'01' or B'10'. The value has the characteristic of "informational and lagging" if duplexing is active and the duplexing type is B'10'. The value has the characteristic of "functional and lagging" if duplexing is active and the duplexing type is B'01'. The value is set when asynchronous duplexing is activated by the activate-duplexing command to the value of the LAOSN operand with Bits (52–PCQCH) to 63 set to 1.

Figure 10:
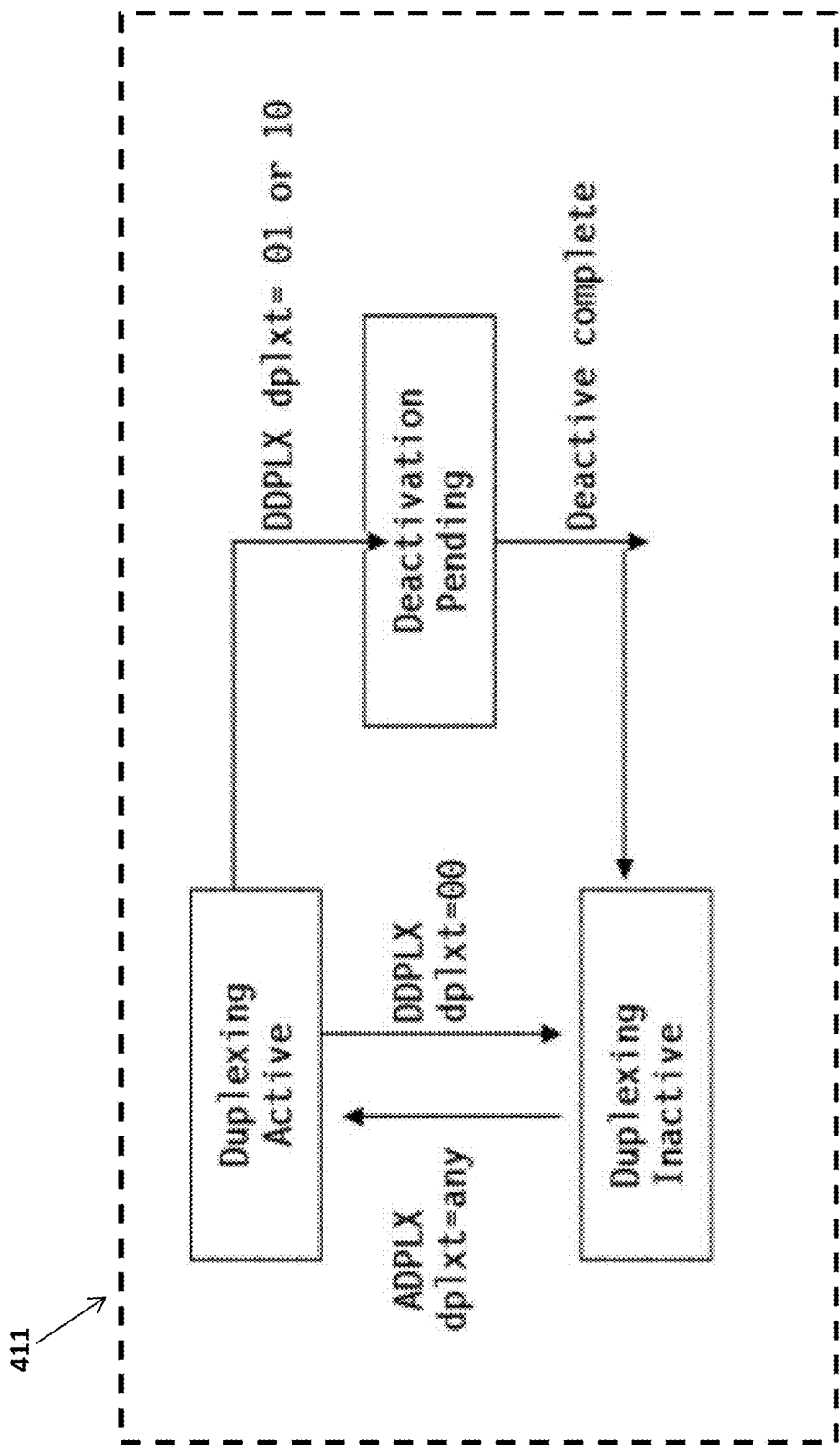
FIG. 10 is a process flow diagram illustrating the effects of activate duplexing and deactivate duplexing on the duplexing state of structures for various duplexing types.

In at least one embodiment, an asynchronously duplexed structure 411 can be associated with the following states: (I) Duplexing States; and (II) PLSO Circular Queue Entry States. The Duplexing States include three different types: (a) Duplexing Active; (b) Duplexing Inactive; and (c) Deactivation Pending. The effects of activate duplexing and deactivate duplexing on the duplexing state of the structures 411 for each of the three duplexing types (a)-(c) is illustrated in FIG. 10 according to a non-limiting embodiment.

The Duplexing-Active state includes a structure 411 which is placed in the duplexing active state by an activate duplexing command. The structure 411 must be initially in the duplexing inactive state.

The Duplexing-Inactive state includes a structure 411 that is in the duplexing-inactive state when the structure 411 is initially allocated. A structure 411 that is duplexing active is placed in the duplexing inactive state by a deactivate-duplexing command, or by an internal error.

The Deactivation-Pending state only applies to structures 411 with a duplexing type of primary or secondary asynchronous duplexing. The Deactivation-Pending State includes a structure 411 that is placed in the deactivation-pending state by the deactivate-duplexing command when it is initially processed for a structure 411 which is an active asynchronously duplexed structure. It remains in the deactivation pending state until the respective coupling facility can guarantee a consistent state for operation sequence values for the structure 411. Whether or not this state is made aware of the system issuing the deactivate duplexing command is implementation and/or timing dependent.

The technical benefits described herein ensure that operations are not over-written in a primary (originating) circular buffer until information is received from a secondary (receiving) circular buffer indicating that the operation corresponding to a queue entry has been completed at the associated structure. The circular queues contain information of Push Operation Block (POB) and corresponding metadata, such as whether an operation has been processed, or pushed out at a coupling facility. If a queue at a receiving end is full, the queue at the originating end will also be full and the originating coupling facility stops. In at least one embodiment, sequence values associated with events or updates applied to a coupling facility structure are utilized to maintain synchronization of two independent circular queues in a primary coupling facility and a secondary coupling facility, respectively. A portion of the data block, e.g., low order bits/bytes, indicates a sequence value which in turn is used to index the data block into a circular queue. The data block can also include metadata associated with each circular queue entry to indicate states which transition based on indicated values of sequence numbers received at the secondary coupling facility and back on responses from the secondary coupling facility to the primary coupling facility. In this manner, functional equivalency is maintained between the primary coupling facility and the secondary coupling facility.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting-data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the term "module" refers to an application specific integrated circuit (ASIC), an electronic circuit, an electronic computer processor (shared, dedicated, or group) and memory that executes one or more software or firmware programs, a combinational logic circuit, and/or other suitable components that provide the described functionality. When implemented in software, a module can be embodied in memory as a non-transitory machine-readable storage medium readable by a processing circuit and storing instructions for execution by the processing circuit for performing a method.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computing system configured to maintain equivalency of independent queues located in different coupling facilities, the computing system comprising:

a first coupling facility including a first structure, the first coupling facility configured to receive a plurality of different commands instructing the first coupling facility to load data into the first structure;

a first queue included with the first coupling facility, wherein the first coupling facility is configured to generate a first command data block including first data corresponding to a received first command among the plurality of commands and a first sequence value indicating a sequence at which the first data was loaded into the first structure with respect to remaining data corresponding to the plurality of commands;

loading the first data into a second queue included with a second coupling facility; and the second coupling facility different from the first coupling facility, the second coupling facility including a second structure and a second queue in signal communication with the first coupling facility, the second coupling facility configured to receive the first command data block from the first queue and to load the first data from the second queue into the second structure based on the first sequence value.

2. The computing system of claim 1, wherein the second coupling facility outputs a first response data block in response to the first command data block, wherein the first command data block includes first metadata indicating a processing status of the first structure and the first response data block includes second metadata indicating a processing status of data associated with the second structure.

3. The computing system of claim 2, wherein the first coupling facility purges the first data block from the first queue to generate a free queue slot in response to the second metadata indicating that loading of the first data into the second structure is complete.

4. The computing system of claim 3, wherein the primary coupling facility halts sending command data blocks to the second queue in response to determining the second queue is full.

5. The computing system of claim 2, wherein at least one of the first structure and the second structure are allocated according to a designated duplexing type among a plurality of different duplexing types.

6. The computing system of claim 5, wherein a characteristic of the first sequence value varies based on the designated duplexing type of at least one of the first structure and the second structure.

7. The computing system of claim 6, wherein the first queue stores a plurality of objects indicating data stored in the first structure and the sequence value associated with the data, wherein a queue order at which each object is stored in the first queue is independent from an order at which the data of a respective object is stored in the first structure.

8. A method of maintaining equivalency of independent queues in different coupling facilities, the method comprising:

receiving a plurality of different commands instructing a first coupling facility to load data into a first structure;

generating a first command data block, the first command data block including first data corresponding to a first command among the plurality of different commands and a first sequence value indicating a sequence at which the first data was loaded into the first structure with respect to remaining data corresponding to the plurality of different commands;

receiving the first command data block by second coupling facility from a first queue included with the first coupling facility; and loading the first data into a second queue included with a second coupling facility; and loading, by the second coupling facility, the first data from the second queue included with the second coupling facility into a second structure included with the second coupling facility based on the first sequence value.

9. The method of claim 8, further comprising outputting, by the second coupling facility, a first response data block in response to the first data block, wherein the first command data block includes first metadata indicating processing status of the first structure and the first response data block includes second metadata indicating a processing status of the second structure.

10. The method of claim 9, further comprising purging, by wherein the first coupling facility, the first data block from the first queue to generate a free queue slot in response to the second metadata indicating that loading of the first data into the second structure is complete.

11. The method of claim 10, wherein the primary coupling facility halts sending command data blocks to the second queue in response to determining the second queue is full.

12. The method of claim 9, further comprising allocating at least one of the first structure and the second structure according to a designated duplexing type among a plurality of different duplexing types.

13. The method of claim 12, further comprising varying characteristic of the first sequence value varies based on the designated duplexing type of at least one of the first structure and the second structure.

14. The method of claim 13, storing, by the first queue, a plurality of objects indicating data stored in the first structure and the sequence value associated with the data, wherein a queue order at which each object is stored in the first queue is independent from an order at which the data of a respective object is stored in the first structure.

15. A computer program product comprising a computer readable storage medium having program instructions for maintaining equivalency of independent queues in different coupling facilities, the program instructions executable by a processor to perform operation of:

receiving a plurality of different commands instructing a first coupling facility to load data into a first structure;

generating a first command data block, the first command data block including first data corresponding to a first command among the plurality of different commands and a first sequence value indicating a sequence at which the first data was loaded into the first structure with respect to remaining data corresponding to the plurality of different commands;

receiving the first command data block from a first queue included with the first coupling facility; and loading the first data into a second queue included with a second coupling facility; and loading, by the second coupling facility, the first data from the second queue included with the second coupling facility into a second structure included with the second coupling facility based on the first sequence value.

16. The computer program product of claim 15, further comprising outputting, by the second coupling facility, a first response data block in response to the first data block, wherein the first command data block includes first metadata indicating processing status of the first structure and the first response data block includes second metadata indicating a processing status of the second structure.

17. The computer program product of claim 16, further comprising purging, by wherein the first coupling facility, the first data block from the first queue to generate a free queue slot in response to the second metadata indicating that loading of the first data into the second structure is complete.

18. The computer program product of claim 17, wherein the primary coupling facility halts sending command data blocks to the second queue in response to determining the second queue is full.

19. The computer program product of claim 16, further comprising allocating at least one of the first structure and the second structure according to a designated duplexing type among a plurality of different duplexing types.

20. The computer program product of claim 19, further comprising varying characteristic of the first sequence value varies based on the designated duplexing type of at least one of the first structure and the second structure.

* * * * *